May 6, 1958 — B. R. BAGLEY — 2,833,573

FABRICATED PULLEY HUB

Filed March 12, 1954

INVENTOR.
Bruce R. Bagley
BY Barthel + Bugbee
Attys

United States Patent Office 2,833,573
Patented May 6, 1958

2,833,573

FABRICATED PULLEY HUB

Bruce R. Bagley, Detroit, Mich.

Application March 12, 1954, Serial No. 415,738

2 Claims. (Cl. 287—52)

This invention relates to pulleys and, in particular, to hubs for pulleys.

One object of this invention is to provide a fabricated pulley hub which is made up of an outer member in the form of a flanged disc secured to a bushing or inner member upon which it is mounted by a press fit, both members being conveniently made from sheet metal.

Another object is to provide a fabricated pulley hub of the foregoing construction which provides a maximum strength yet uses a minimum amount of metal, and can be produced to very accurate dimensions at a much lower cost than present hubs turned out of solid bar stock.

Other objects and advantages of the invention will become apparent during the course of the following description of the accompanying drawings, wherein.

Pulley hubs as hitherto constructed have been formed, for the most part, by machining them out of solid bar stock. This prior construction is very expensive, uses a considerable amount of metal, and results in a heavy hub. The present invention provides a fabricated pulley hub which is made up from two parts formed from sheet metal and united by a press fit and afterward secured to one another by welding, brazing or the like. The pulley hub of the present invention is formed to very accurate dimensions by a coining operation on the face of the flange and by a sizing operation on the bore in the bushing, thereby producing a very accurate hub at a minimum cost yet possessing maximum strength with the minimum amount of metal.

Figure 1:
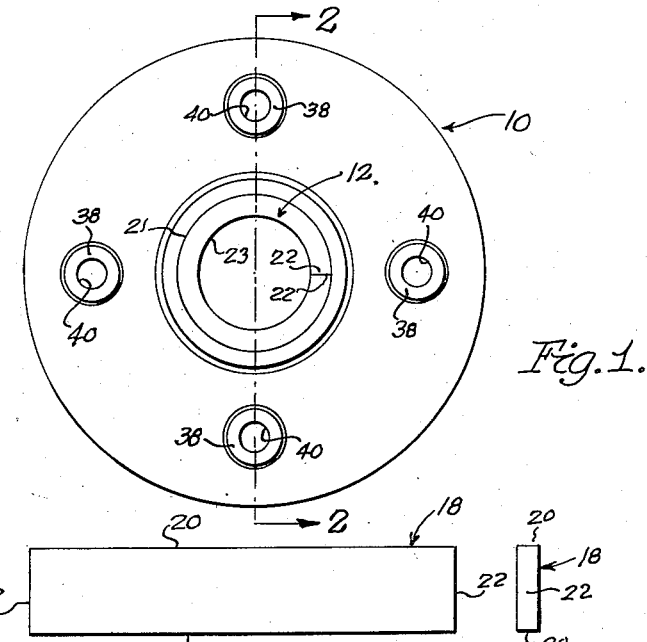
Figure 1 is a front elevation of a pulley hub, according to one form of the invention.
Figure 6:
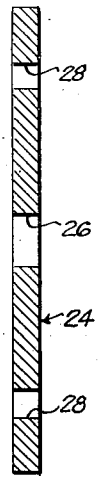
Figure 6 is a central vertical section along the line 6—6 in Figure 5.

Referring to the drawings in detail, Figure 1 shows a pulley hub, generally designated 10, as consisting generally of an inner member or bushing 12 upon which is mounted an outer member or flange, generally designated 14. Both members 12 and 14 are produced by operations upon sheet metal, and united in the manner described below, so as to form a support for a pulley or sheave, generally designated 16, shown in dotted lines in Figure 2.

Figure 2:
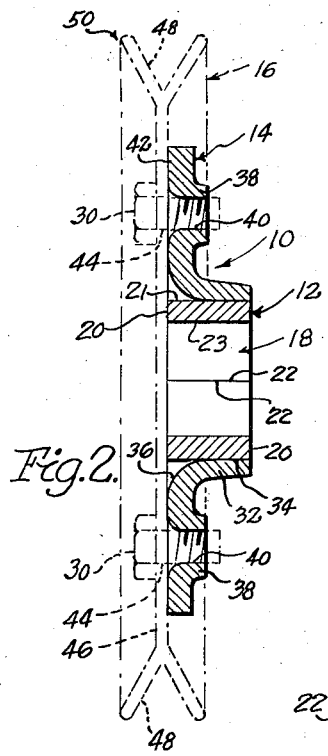
Figure 2 is a central vertical section taken along the line 2—2 in Figure 1.
Figures 3, 4, 5:
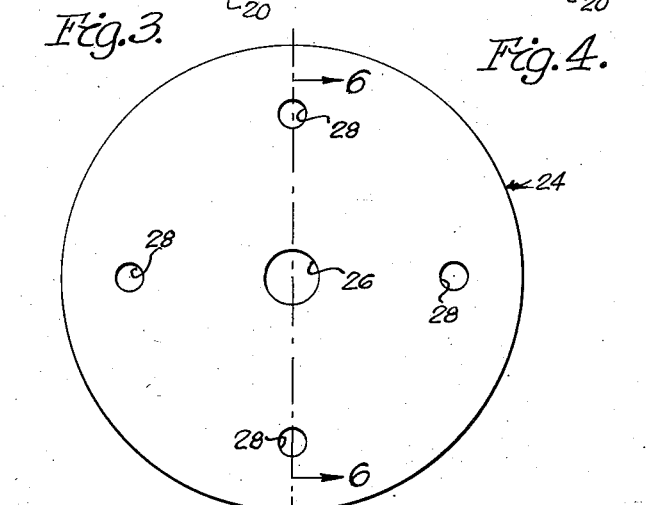
Figure 3 is a top plan view of a blank from which the inner portion of the hub is formed.
Figure 4 is an end elevation of the blank shown in Figure 3.
Figure 5 is a front elevation of the blank from which the outer member is formed.

The inner member or bushing 12 is formed from a sheet metal blank 18 (Figures 3 and 4) consisting of an elongated strip of sheet metal of the desired thickness for the bushing and having sides 20 with lengths equal to the circumference of the desired bushing and edges 22 having lengths equal to the desired lengths of the bushing. The blank 18 is rolled or otherwise formed into tubular shape with its edges 22 abutting one another so as to form the bushing or sleeve 12 having external and internal surfaces 21 and 23, as shown in Figures 1 and 2. The bushing 12 is then ready for assembly with the outer member 14.

The outer member 14 is formed from a flat sheet metal blank, generally designated 24, in the shape of a circular disc with a central aperture 26 and a suitable number of holes 28, four being shown, in the locations desired for the later threaded screw holes to receive the screws or bolts 30 by which the pulley 16 is secured to the hub 10. The disc-shaped blank 24 is then placed in a die in a punch press and subjected to the action of a suitably-shaped punch in order to form a tubular central portion 32 having a bore 34 therein of a slightly smaller diameter than the external diameter of the bushing 12 so that the two members 12 and 14 will be assembled with a press fit. The formation of the tubular central portion 32 and its bore 34 results in the formation of a flared or rounded mouth or entrance 36 to one end of the bore 34.

Preferably simultaneously with the formation of the central tubular portion, the die also deforms the area around each hole 28 into an annular boss 38 with a flared hole 40 extending through it in the place previously occupied by the hole 28. The holes 40 are then threaded with a thread conforming to the thread of the bolts or screws 30 to be used therein.

The inner and outer members 12 and 14 are now placed in an arbor press or its equivalent and, assuming that the diameter of the external surface 21 is of the proper dimensions relatively to the internal diameter of the bore 34 in the outer member 14, the two members 12 and 14 are forced into telescoping relationship with one another with a press fit, resulting in the assembly shown in Figures 1 and 2. In addition to the press fit, the outer and inner members 14 and 12 are additionally secured to one another by brazing, welding or the like. The face 42 of the outer member or flange 14 is then coined by subjecting it to a coining operation in order to provide a sufficiently accurate mounting face for the pulley 16, using a conventional coining press or its equivalent. By a separate operation, or preferably at the same time as the coining operation, the bore 23 in the inner member or bushing 12 is subjected to a sizing operation in order to accurately determined its diameter, so that it will accurately fit the shaft upon which the pulley is to be mounted. In this manner there is produced from sheet metal parts by inexpensive operations a pulley hub which has maximum strength with a minimum amount of metal required for its manufacture.

The use of the pulley hub 10 is shown in Figure 2, wherein the pulley 16 of any conventional type, such as an automobile fan belt pulley, is secured to the hub 10 by inserting bolts or screws 30 through suitably located holes 44 in the web 46 of the pulley 16 and threading them into the threaded holes 40 in the flange or outer member 14. The formation of the bosses 38 provides a greater thickness of metal for the threads and consequently gives a greater purchase upon the threads of the screw 30. The assembly of the pulley 16 and hub 10, generally designated 50, is then mounted in the usual way upon a shaft (not shown) and a belt (not shown) applied to its belt groove 48.

What I claim is:

1. A fabricated hub for mounting a pulley upon a shaft, said hub comprising a built-up multi-piece body including a tubular inner member consisting of a strip of sheet material disposed in a circular path with its opposite edges abutting one another in a generally axial direction extending longitudinally thereof and having a bore adapted to receive said shaft, and a generally disc-shaped outer member having a radially-disposed disc-shaped marginal portion and an integral central tubular portion projecting axially therefrom and also containing a bore, said tubular inner member being tightly and permanently secured in said outer member bore, said marginal portion having means thereon for securing said pulley thereto, said outer member tubular portion being disposed in constricting engagement with said tubular inner member and holding said opposite edges of said tubular inner member in tightly-compressed abutting engagement with one another.

2. A fabricated hub for mounting a pulley upon a shaft, said hub comprising a built-up multi-piece body including a tubular inner member consisting of a strip of sheet material disposed in a circular path with its opposite edges abutting one another in a generally axial direction extending longitudinally thereof and having a bore adapted to receive said shaft, and a generally disc-shaped outer member having a radially-disposed disc-shaped marginal portion and an integral central tubular portion projecting axially therefrom and also containing a bore, the external surface of said tubular inner member being tightly and permanently secured in said outer member bore, said marginal portion having means thereon for securing said pulley thereto, said outer member tubular portion being disposed in constricting engagement with said tubular inner member and holding said opposite edges of said tubular inner member in tightly-compressed abutting engagement with one another, the bore in said outer member tubular portion having an internal diameter sufficiently smaller than the external diameter of said inner member external surface to make a press fit therebetween when assembled.

References Cited in the file of this patent

UNITED STATES PATENTS

| | | |
|---|---|---|
| 1,521,823 | Martins | Jan. 6, 1925 |
| 1,578,983 | Gossett | Mar. 30, 1926 |
| 1,730,482 | Slyden | Oct. 8, 1929 |
| 2,266,499 | Leake | Dec. 16, 1941 |
| 2,321,829 | Leake | June 15, 1943 |

FOREIGN PATENTS

| | | |
|---|---|---|
| 851,184 | France | Sept. 25, 1939 |
| 871,231 | Germany | Mar. 19, 1953 |